United States Patent
Kim et al.

(10) Patent No.: US 9,392,168 B2
(45) Date of Patent: Jul. 12, 2016

(54) METHOD FOR CONTROLLING CAMERA IN MOBILE DEVICE TO TURN ON OR OFF BASED ON APPLICATION

(71) Applicant: Samsung Electronics Co. Ltd., Suwon-si, Gyeonggi-do (KR)

(72) Inventors: Mingyu Kim, Suwon-si (KR); Woohyun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 14/033,830

(22) Filed: Sep. 23, 2013

(65) Prior Publication Data

US 2014/0092264 A1    Apr. 3, 2014

(30) Foreign Application Priority Data

Sep. 28, 2012  (KR) ......................... 10-2012-0109178

(51) Int. Cl.
*H04N 5/232* (2006.01)
*G06F 1/32* (2006.01)

(52) U.S. Cl.
CPC .......... *H04N 5/23241* (2013.01); *G06F 1/3206* (2013.01); *H04N 5/23222* (2013.01); *G03B 2217/007* (2013.01)

(58) Field of Classification Search
CPC ............ H04N 5/23241; H04N 5/3698; H04N 1/00885; H04N 1/00891; H04N 1/00896; G03B 2217/007; G03B 7/26; G06F 1/3206; G06F 1/3228
See application file for complete search history.

(56) References Cited

U.S. PATENT DOCUMENTS

| | | | | |
|---|---|---|---|---|
| 2007/0065140 A1* | 3/2007 | Sorsa | ................ | H04M 1/72522 396/429 |
| 2008/0270900 A1* | 10/2008 | Wezowski | ............. | G06F 3/0238 715/702 |
| 2009/0273686 A1* | 11/2009 | Kaikumaa | .......... | H04N 5/23229 348/222.1 |
| 2010/0118153 A1* | 5/2010 | Yu | ....................... | H04N 5/23203 348/207.11 |
| 2010/0151903 A1* | 6/2010 | Yamamoto | ............. | H04N 5/235 455/556.1 |
| 2011/0016476 A1* | 1/2011 | Raju | ................. | H04M 1/72555 719/328 |
| 2011/0058052 A1 | 3/2011 | Bolton et al. | | |
| 2011/0157460 A1* | 6/2011 | Kim | ....................... | H04N 5/232 348/372 |
| 2013/0088429 A1* | 4/2013 | Yang | ..................... | G06F 1/3231 345/158 |
| 2013/0196595 A1* | 8/2013 | Byrne | ............... | H04W 52/0251 455/41.1 |
| 2013/0201360 A1* | 8/2013 | Song | .................. | H04N 5/23241 348/222.1 |
| 2013/0318476 A1* | 11/2013 | Sauve | ................... | G06F 9/4443 715/835 |
| 2014/0043498 A1* | 2/2014 | Lee | .................... | H04N 5/23241 348/222.1 |
| 2014/0300779 A1* | 10/2014 | Yeo | ...................... | H04N 5/2351 348/234 |
| 2014/0375834 A1* | 12/2014 | Lohan | .................. | G06Q 10/101 348/211.99 |
| 2015/0058754 A1* | 2/2015 | Rauh | ..................... | G06F 3/0482 715/753 |
| 2015/0326787 A1* | 11/2015 | Ozaki | .................... | G03B 17/18 348/333.13 |

* cited by examiner

*Primary Examiner* — John Villecco
(74) *Attorney, Agent, or Firm* — Jefferson IP Law, LLP

(57) ABSTRACT

A method for controlling a camera in a mobile device including a camera is provided. The method includes executing a first application related to the camera, turning the camera on in response to an execution of the first application, detecting a user's input related to a termination of the first application, determining whether the user's input is an Application (App) conversion event requesting an execution of a second application related to the camera, terminating the execution of the first application when the user's input is the App conversion event, and executing the second application, and terminating the execution of the first application when the user's input is not the App conversion event, and turning the camera off.

14 Claims, 7 Drawing Sheets

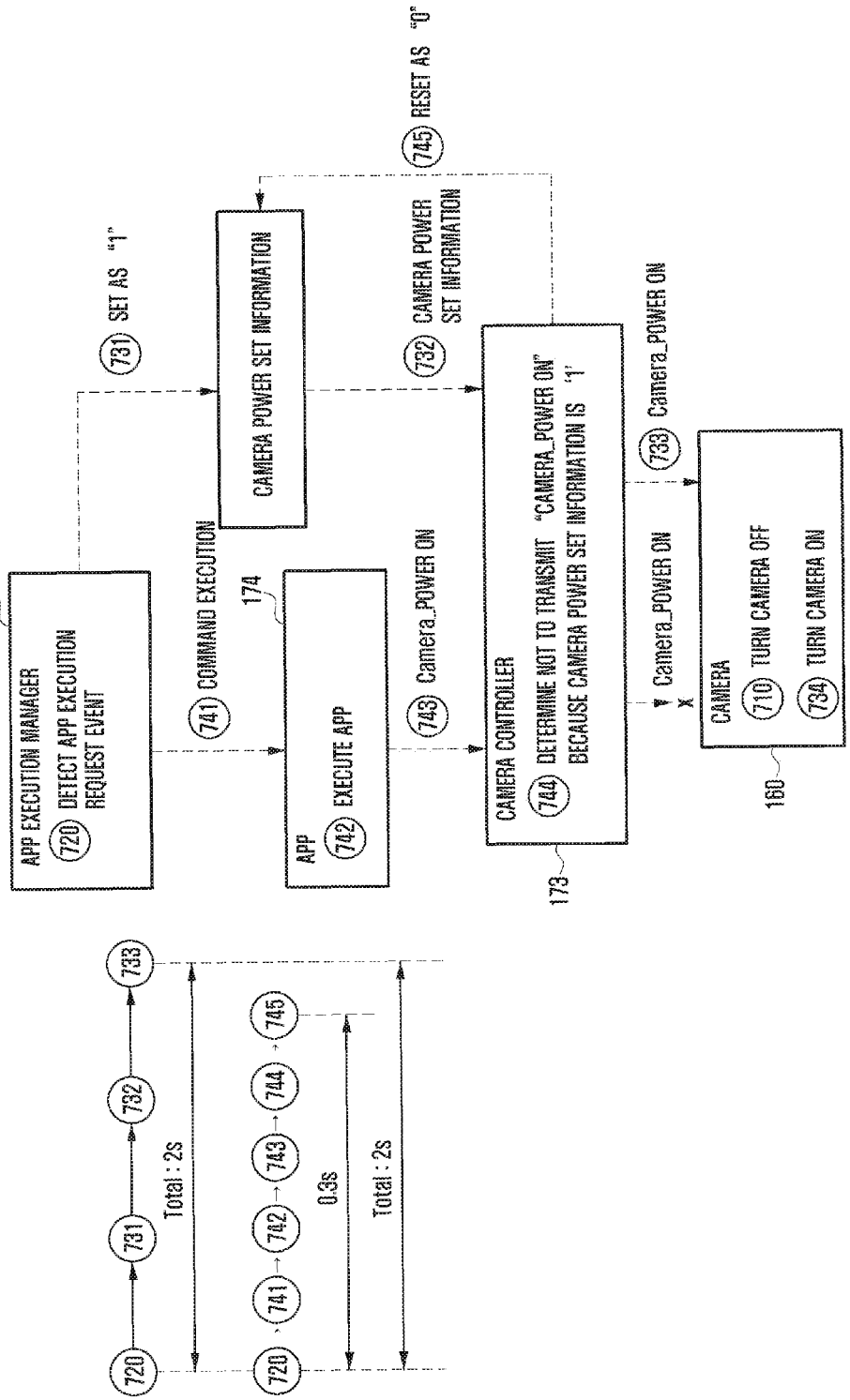

METHOD FOR CONTROLLING CAMERA IN MOBILE DEVICE TO TURN ON OR OFF BASED ON APPLICATION

CROSS-REFERENCE TO RELATED APPLICATION(S)

This application claims the benefit under 35 U.S.C. §119 (a) of a Korean patent application filed on Sep. 28, 2012 in the Korean Intellectual Property Office and assigned Serial No. 10-2012-0109178, the entire disclosure of which is hereby incorporated by reference.

TECHNICAL FIELD

The present disclosure relates to a method for controlling a camera and a mobile device. More particularly, the present disclosure relates to a method for controlling an execution of an application related to a camera and a power on/off in a camera, and a mobile device having a camera which has been applied to the method thereof.

BACKGROUND

A mobile device may be equipped with a camera, and may have an operating system which is capable of a multi-tasking such as Linux or Windows. In addition, the mobile device may be equipped with various applications related to the camera. In general, when a user requests an execution of an application related to the camera through an input unit (for example, a touch panel), the corresponding application is executed. After that, power of a battery is supplied to the camera, and accordingly, the camera is activated (for example, an operation for converting light received from a lens into an electrical signal, and processing the electrical signal to image data). When the application related to the camera is terminated, power supplied to the camera is cut off and, accordingly, the operation of the camera is terminated.

According to a camera controlling method of the related art, when a conversion from a first Application (App) related to a camera to a second App related to a camera is required, it has a problem that power of the camera is turned off (Power OFF; power supplied to a camera is cut off and an operation of a camera is terminated) and returned to Power On (power is supplied to a camera and a camera is operated). That is, unnecessary power off of the camera is generated. Accordingly, there is a problem that a conversion speed from a first App to a second App is being slowed and an electric current to re-operate the camera is consumed. In addition, according to a camera controlling method, the power in the camera is turned on after the application related to the camera is executed. Accordingly, there is a problem in that the camera is operated slowly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and to provide at least the advantages described below. Accordingly, an aspect of the present disclosure is to provide a method and a mobile device for converting quickly into a second Application (App) and reducing a consumption current by maintaining the power on state in the camera when the conversion from a first App to a second App is performed. In addition, an aspect of the present disclosure is to provide a method and a mobile device to make the camera to be operated quickly when there is a user's request for an execution of an application related to the camera by turning on the camera and executing the corresponding application.

In accordance with an aspect of the present disclosure, a method for controlling a camera in a mobile device including a camera is provided. The method includes executing a first application related to the camera, turning the camera on in response to an execution of the first application, detecting a user's input related to a termination of the first application, determining whether the user's input is an App conversion event requesting an execution of a second application related to the camera, terminating the execution of the first application when the user's input is the App conversion event, and executing the second application, and terminating the execution of the first application when the user's input is not the App conversion event, and turning the camera off.

In accordance with another aspect of the present disclosure, a mobile device is provided. The device includes a camera, an input unit, and a controller which detects a user's input from the input unit, and controls the camera in response to the user's input, wherein the controller turns the camera on in response to an execution of a first application related to the camera, determines whether the user's input is an App conversion event requesting an execution of a second application related to the camera in response to a detection of a user's input related to a termination of the first application, terminates the execution of the first application and executes the second application when the user's input is the App conversion event, and terminates the execution of the first application and turns the camera off when the user's input is not the App conversion event.

In accordance with yet another aspect of the present disclosure, a method for controlling a camera in a camera controller of a mobile device including a camera is provided. The method includes receiving a first camera turn on request signal from an application, checking a camera power set information in response to a reception of the first camera turn on request signal, determining not to transmit the first camera turn on request signal to the camera, when the camera power set information indicates the camera is in a turn on state as a result of the check, and transmitting the first camera turn on request signal to the camera, when the camera power set information indicates the camera is in a turn off state as a result of the check.

In accordance with still another aspect of the present disclosure, a mobile device is provided. The device includes a camera, an input unit, and a controller which detects a user's input from the input unit, and controls the camera in response to a detection of the user's input, wherein the controller includes a camera controller which receives a first camera turn on request signal from an application, checks a camera power set information in response to a reception of the first camera turn on request signal, determines not to transmit the first camera turn on request signal to the camera when the camera power set information indicates the camera is in a turn on state as a result of the check, and transmits the first camera turn on request signal to the camera when the camera power set information indicates the camera is in a turn off state as a result of the check.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which:

FIG. 7 is a software architecture explaining another example of a procedure of executing an App related to a camera and turning on power of a camera according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile device according to the present disclosure includes a camera and an operating system which can perform a multi-tasking, and refers to a portable electrical device such as a smart phone, a tablet Personal Computer (PC), a notebook PC, and a digital camera. An execution of an App in the present disclosure includes at least one of a procedure of loading an App from a secondary memory unit to a main memory of a portable device, and a procedure of displaying an execution screen of an App which has been loaded to the main memory. A termination of the App in the present disclosure includes at least one of a procedure of terminating a display of the corresponding execution screen, and a procedure of deleting an App from a main memory of a portable device.

Hereinafter, a method for controlling a camera and a mobile device according to the present disclosure will be described in detail.

Figure 1:
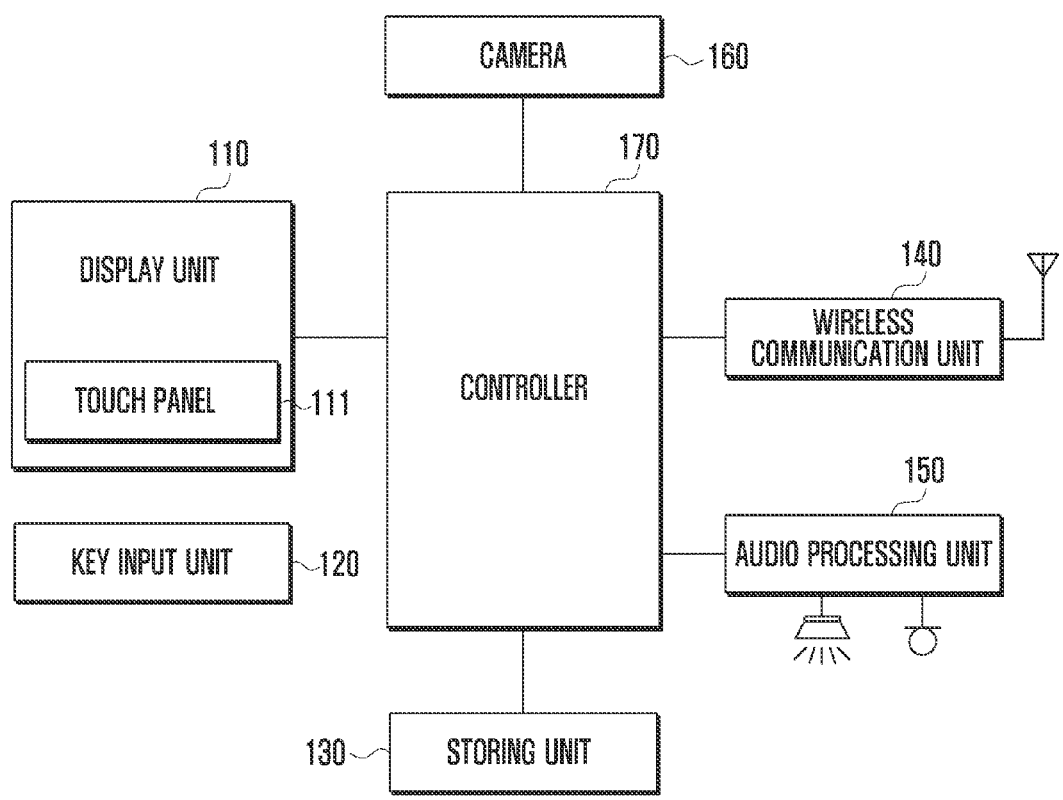
FIG. 1 is an electric block diagram of a mobile device according to an embodiment of the present disclosure.

FIG. 1 is an electrical block diagram of a mobile device according to an embodiment of the present disclosure.

Referring to FIG. 1, the mobile device according to the present disclosure is configured to include a display unit 110, a key input unit 120, a storing unit 130, a wireless communication unit 140, an audio processing unit 150, a camera 160, and a controller 170.

The display unit 110 displays an image under the control of the controller 170. The controller 170 stores data in a buffer when rendering an image. The display unit 110 displays the image stored in the buffer by converting the data into an analog signal. In other words, the display unit 110 may display various images according to a use of the mobile device, for example, a lock screen, a home screen, an execution screen of an Application (App), and a keypad. The lock screen is an image displaying on the display unit 110 when the display unit is turned on. When a user's input to release a lock is detected, the controller 170 may change the displaying image from the lock screen to the home screen or the App execution screen. The home screen may include a background image and a plurality of icons being displayed on the background image. Here, each icon corresponds to an App. When any one of icons is selected by the user (for example, the user taps the icon), the controller 170 executes the corresponding App (for example, a browser), and displays its execution screen on the display unit 110.

The display unit 110 displays any one of the screens, for example, the application execution screen as the background and may display another one, for example a keypad as a foreground by overlapping the background under the control of the controller 170. In addition, the display unit 110 displays a first image on a first screen area and a second image on a second screen area under the control of the controller 170. The display unit 110 may be configured as a Liquid Crystal Display (LCD), an Organic Light Emitted Diode (OLED), an Active Matrix Organic Light Emitted Diode (AMOLED), or a Flexible display.

The display unit 110 may include a touch panel 111 as an input unit. Accordingly, the display unit 110 may be named as a touch screen. The touch panel 111 may be placed on the display unit. In detail, the touch panel 111 may be implemented as an add-on type which is disposed above the display unit 110, or an on-cell type or an in-cell type which are inserted into the display unit 110.

The touch panel 111 generates an analog signal (for example, a touch event) in response to a user's gesture corresponding to the touch panel 111, and delivers the analog signal to the controller 170 by performing an analog to digital (A/D) conversion. Here, the touch event includes a touch coordinate (x, y). When the touch coordinate is received from the touch panel, the controller 170 determines that a touch tool (for example, a finger or a pen) is touched to the touch panel 111, and determines that the touch in the touch tool is released when the touch coordinate is not received from the touch panel 111. In addition, the controller 170 detects a touch movement from the touch panel 111. In other words, the controller 170 determines that a touch has moved, for example, when the touch coordinate has changed from (x1y1) to (x2y2). The controller 170 calculates the position change amount (dx, dy) of the touch in response to the movement of the touch. The controller 170 detects a user's input from the touch panel 111. Here, the user input is divided into a touch, a multi tap, a double tap, a long tap, a tap & touch, a drag, a flick, a press, a pinch in, and a pinch out. The touch refers to a user's input touching a touch tool to any one certain point of the touch panel 111 of the screen by the user, the multi touch refers to a user's input touching a plurality of touch tools (for example, a thumb and an index finger) on the various points, the tap refers to a user's input of a touch-off operation in which a certain point is touched and the touch input tool releases the touch from a corresponding point without a movement of the touch input tool, the double tap refers to a user's input of tapping twice on a certain point sequentially, the long tap refers to a user's input in which a touch is performed relatively longer than the tap and the touch input tool releases the touch at a corresponding point without a movement of the touch input tool, the tap & touch refers to a user's input re-touching the corresponding point within a predetermined time (for example, 0.5 second) after tapping a certain point of a screen, the drag refers to a user's input of moving the touch input tool in a predetermined direction in a state where a certain point is touched, the flick refers to a user's input releasing the touch after moving the touch input tool relatively faster than the drag, the press refers to a user's input of pressing a corresponding point after touching a certain point with the touch input tool, the pinch in is a user's input narrowing an interval between the touch tools after multi touching two points at the same time by two touch tools, and the pinch out is a user's input broadening an interval between the touch tools. In other words, the touch refers to a state of contacting to the touch panel 111 and the other user's inputs refer to a touch change. The touch panel 111 is equipped with a pressure sensor and may detect the pressure of the touched point. The detected pressure information is delivered to the controller 170, and the controller 170 distinguishes the touch and the press based on the detected pressure information.

The touch panel 111 may be a complex touch panel configured to include a hand touch panel detecting a hand gesture and a pen touch panel detecting a pen gesture. Here, the hand touch panel is configured as a capacitive type. To be sure, the hand touch panel may also be configured as a resistive type, an infrared type, or an ultrasonic wave type. In addition, the hand touch panel is not generating a touch event only by a hand gesture of the user but may generate the touch event also by another object (for example, an object of a conductive material that can cause the capacitive change). The pen touch panel may be configured as an electromagnetic induction type. Accordingly, the pen touch panel may generate the touch event by a touch use stylus pen which is specially designed to form a magnetic field.

The key input unit 120 may include a plurality of keys in order to receive number or character information, and to set various functions. Such keys may include a menu loading key, a screen on/off key, a power on/off key, a volume control key and a shutter key etc. The key input unit 120 generates a key event related to a user's setting and a function control of the mobile device, and delivers to the controller 170. The key event may include a power on/off event, a volume control event, a screen on/off event, and a shutter event, etc. The controller 170 controls the elements in response to such key events. On the other hands, a key in the key input unit 120 may be named as a hard key, and a virtual key displayed on the touch screen 110 may be named as a soft key.

The storing unit 130 is a secondary memory unit of the controller 170, and may include a disc, a Random Access Memory (RAM), a Read Only Memory (ROM), and a flash memory. The storing unit 130 stores data which is generated from the mobile device or is received from an external device (for example, a server, a desktop Personal Computer (PC), and a tablet PC, etc.) through the wireless communication unit 140 or an external device interface (not shown).

The storing unit 130 stores a booting program, an Operating System (OS), a camera controller, and an App execution manager. Here, the camera controller is a program operating based on the operating system and controlling an operation of the camera. The App execution manager is a program operating based on the operating system, and managing an execution of the Apps.

The storing unit 130 may include an embedded application and/or a 3rd party application. The embedded application refers to the application embedded in the mobile device. For example, the embedded application may be a browser application, an email application, an instant message application, a camera controller application, and an App launcher application. As being noted, the 3rd party application refers to the application that can be installed to be downloaded to the mobile device from an on-line market, and is very diverse. Such a 3rd party application is free of an installation and a removal. When power of a battery is supplied to the controller 170 of the mobile device, first, the booting program is loaded to a main memory (for example, a RAM) of the controller 170. Such booting program loads the operating system to the main memory so that the mobile device may be operated. The operating system loads the camera controller and the App launcher to the main memory. Such booting and loading are well known techniques in the computer system, thus, the detailed description thereof will be omitted herein.

The wireless communication unit 140 performs a voice call, a video call, or a data communication with an external device (e.g., an external display device) under the control of the controller 170. The wireless communication unit 140 includes a radio frequency transmission unit which performs up-conversion and amplification of the frequency of the transmitting signal, and a radio frequency receiving unit which performs low noise amplification and down conversion of a receiving signal. In addition, the wireless communication unit 140 may include a mobile communication module (for example, a 3rd-Generation (3G) mobile communication module, a 3.5-Generation (3.5G) mobile communication module, or a 4th-Generation (4G) mobile communication module), a digital broadcasting module (e.g., a Digital Multimedia Broadcasting (DMB) module), and a short range communication module (e.g., Wi-Fi module, a Bluetooth module).

The audio processing unit 150 performs an input and an output function of an audio signal for a voice recognition, a voice recording, a digital recording, and a calling function by combining with a speaker (SPK) and a microphone (MIC). The audio processing unit 150 receives the audio signal from the controller 170 and outputs the received audio signal to the speaker (SPK) after performing digital to analog (D/A) conversion and amplification of the received audio signal. The audio processing unit 150 provides the audio signal received from the microphone (MIC) to the controller 170 after performing analog to the digital (A/D) conversion. The speaker (SPK) outputs the audio signal received from the audio processing unit 150 by converting the audio signal into a sound wave. The microphone (MIC) converts the sound wave delivered from a person or other sound source into the audio signal.

The camera 160 performs a function of outputting to the controller 170 by photographing a subject under the control of the controller 170. In detail, the camera 160 may be configured to include a lens to collect a light, an image sensor which converts the received light to an electrical signal, and an Image Signal Processor (ISP) which processes an electrical signal input from the image sensor to a raw data and outputs to the controller. Here the Image Signal Processor (ISP) may include a module which processes the low data to a preview image and outputs to the controller 170, and a module which processes a low data to a compression image and outputs to the controller 170. In addition, the image signal processor may further include a module which processes a preview image and a compression image to an interleaved data and outputs to the controller 170. The controller 170 detects a shutter event (e.g., a user taps a shutter button displayed on the display unit 110) from the touch panel 111 or the key input unit 120, and stores the compression image in the storing unit 130 in response to the shutter event.

The preview image is an image displaying on the display unit 110 and refers to the low resolution data which is re-sized to fit to a screen size. In other words, the preview image is an image having a lower resolution than the resolution of the original image. Such a preview image may be stored as a thumbnail. The compression image is used for storage and refers to a data compressed so as to use less memory when being stored (e.g., data in a format such as Joint Photographic Experts Group (JPEG). The interleave data refers to a data in the form of a preview image and the compression image which are mixed. In other words, when the image is consisted of a packet unit, the interleave data is the packets of the preview image and the packets of the compression image which are mixed in randomly or with certain rules.

The controller 170 controls an overall operation of the mobile device and the signal flow between the internal configurations of the mobile device, performs the data processing function, and controls power supplied from a battery to the configurations. The controller 170 may include a main memory which temporarily stores a booting program, an operating system, and an application, a cache memory which temporarily stores data to be written to the storing unit 130 and temporarily stores the data read from the storing unit 130, a Central Processing Unit (CPU), and a Graphic Processing Unit (GPU). Here, the operating system serves as an interface between a hardware and the application, and between the applications, and manages the computer sources such as the Central Processing Unit (CPU), the Graphical Processing Unit (GPU), the main memory, and the secondary memory unit. In addition, the operating system controls the operation of the hardware and an execution of the application, determines the order of the tasks, controls a calculation of the CPU and the GPU, and manages to store a data and a file.

On the other hand, the CPU is used to perform a computation and a comparison of data, and an interpretation and an execution of a command. The GPU is a graphic control unit performing a computation and a comparison of the data related to the graphic, and an interpretation and an execution of a command on behalf of the CPU. The CPU and the GPU may be combined as one package where two or more independent cores (e.g., a quad-core) are formed as a single integrated circuit. In addition, the CPU and the GPU may be the one which is integrated into a System on Chip (SoC). Also, the CPU and the GPU may be the one which is packaged as a multi-layer. On the other hands, a configuration including the CPU and the GPU may be named as an Application Processor (AP).

Hereinafter, the technical features related to the controller 170 of the present disclosure, that is, a camera control technique will be described with reference to the accompanying drawings.

Not all such components may be listed here, because the components may be modified in various manners according to a convergence trend of a digital device. However, the mobile device may further include elements which are not mentioned above, such as a Global Positioning System (GPS) module, a Near Filed Communication (NFC) module, a vibration module, a camera, an accessory, and an external interface unit. Here, the accessary may be an accessory, for example, a pen to touch to the touch panels 111 in the mobile device which is detachable from the mobile device. In addition, in the mobile device, specific elements may be excluded from the above-mentioned configuration or may be substituted by other elements according to its providing type.

Figure 2:
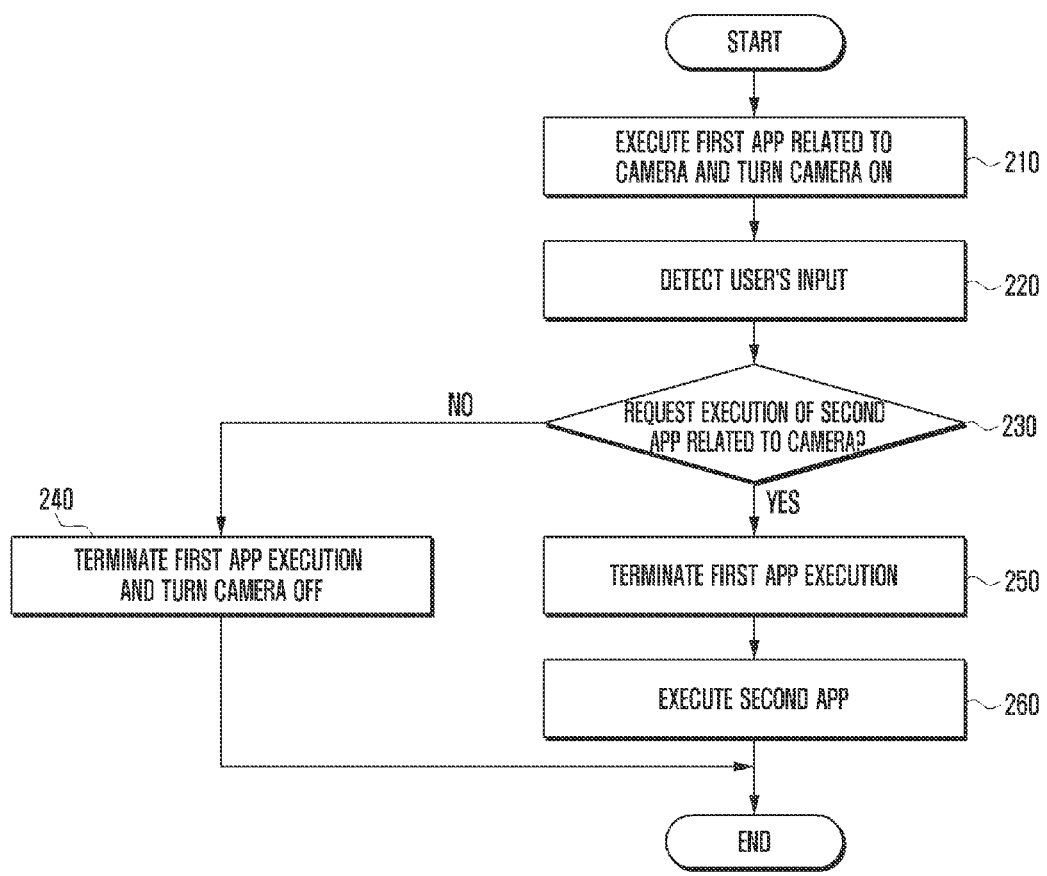
FIG. 2 is a flowchart explaining a method for controlling a camera according to an embodiment of the present disclosure.

FIG. 2 is a flowchart explaining a method for controlling a camera according to an embodiment of the present disclosure.

Referring to FIG. 2, a first App (e.g., a photograph application) related to the camera 160 is executed at operation 210. Then, the camera 160 is turned on. For example, when power of the battery is supplied to the camera 160, and accordingly, the camera 160 converts a light collected by a lens into the electrical signal, processes the electrical signal to the low data, and delivers to the controller 170 by processing the low data to the preview image. The display unit 110 displays the preview image under the control of the controller 170.

The controller 170 detects a user's input related to a termination of a first app from the touch panel 111 or the key input unit 120 at operation 220.

The controller 170 determines whether the user's input is an app conversion event (for example, a user taps an icon corresponding to a remote view finder) requesting an execution of the second app related to the camera 160 at operation 230. Here, the remote view finder is an application which performs a function of transmitting the preview image of the mobile device (for example, a digital camera) to another mobile device (for example, a smart phone), receiving a shutter event from another mobile device, and storing a compression image in the storing unit 130 in response to the received shutter event. Here, a wireless communication method between these two devices may be via Wi-Fi or Bluetooth.

When the user's input is not an App conversion event but another event (for example, a user taps an icon which is not related to the camera 160 or a termination button of the first App corresponding to the App (e.g., a browser)), the controller 170 terminates an execution of the first app at operation 240. In addition, the controller 170 turns the power of the camera 160 off at operation 240. In other words, the controller 170 terminates an operation of the camera 160 by discontinuing the power supplied to the camera 160.

When the user's input is the one requesting an execution of a second app related to the camera 160 (for example, the user taps an icon corresponding to a remote view finder), the controller 170 terminates an execution of a first App at operation 250 and executes the second App at operation 260.

Figure 3:
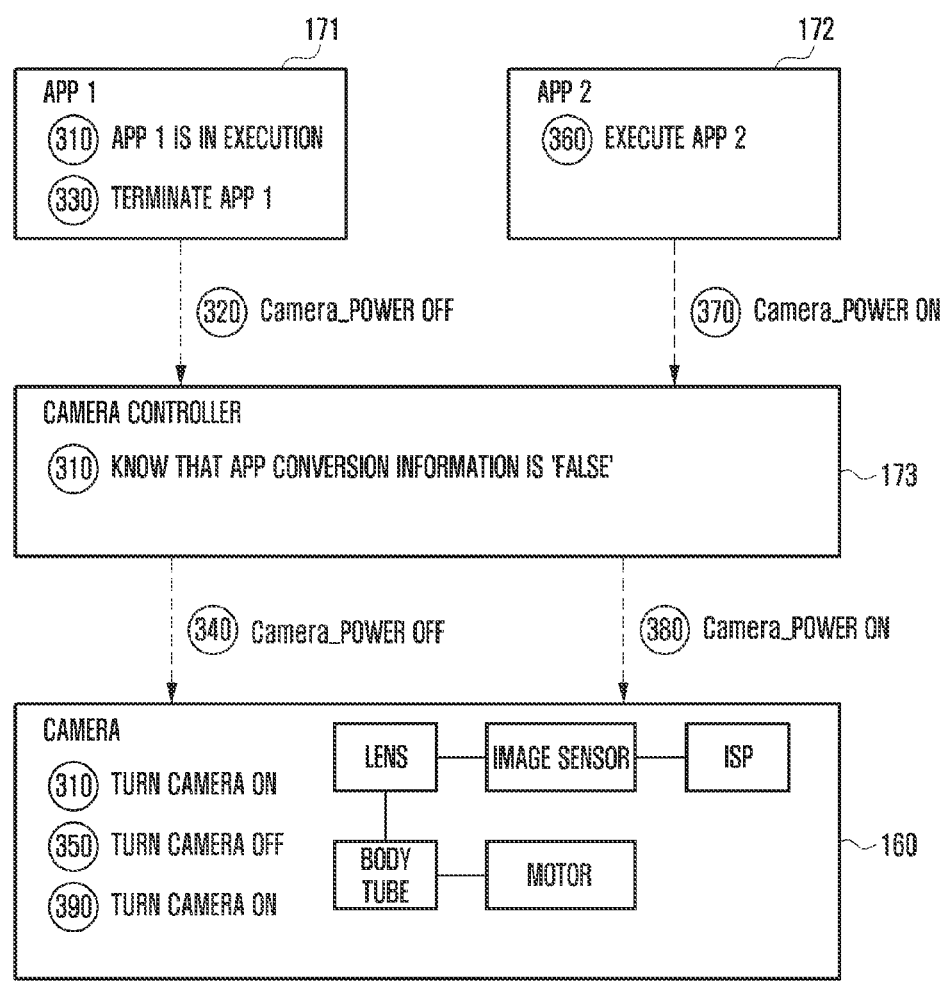
FIG. 3 is a software architecture explaining an example of a procedure of terminating an execution of a first Application (App) related to a camera, and executing a second App related to a camera according to an embodiment of the present disclosure.

FIG. 3 is a software architecture explaining an example of a procedure of terminating an execution of a first App related to a camera, and executing a second App related to a camera according to an embodiment of the present disclosure.

Referring to FIG. 3, the controller 170 includes a first App 171, a second App 172, and a camera controller 173. A camera 160 includes a lens, an image sensor, an Image Signal Processor (ISP), a body tube, and a motor. Here, the body tube is a tube used to control a distance between the lens and the image sensor. The motor is used to protrude the body tube to an exterior of the camera 160, and to insert the body tube to an interior of the camera 160. In other words, when the camera 160 is in a power on state, the body tube positions in the exterior of the camera 160 by the operation of the motor, and when the camera 160 is in a power off state, the body tube positions in the interior of the camera 160 by the operation of the motor.

The first App 171 is in execution, the camera 160 is in the power on state, and the camera controller 173 knows that the app conversion information is 'false' at operation 310. Here, the app conversion information is information referred by the camera controller 173 whether to turn off the camera 160. When the operating system is loaded to the main memory and the camera controller 173 is executed, "false" is set as an initial value of such App conversion information. In addition, the App conversion information is changeable from "false" to "true" by the applications related to the camera 160. Also, it is possible to reset the value of the App conversion information from "true" to "false" by the camera controller 173.

The first App 171 transmits a Camera_Power OFF signal to the camera controller 173 at operation 320. After that, the execution of the first App is terminated at operation 330. For example, the first App 171 detects a termination event from the input unit (e.g., the touch panel 111 or the key input unit 120), and terminates after transmitting the "Camera_Power OFF" signal to the controller 173 in response to the termination event.

The camera controller 173 receives the "Camera_Power OFF" signal from the first App 171. The camera controller 173 determines whether to turn the camera 160 off based on the App conversion information in response to the reception of the "Camera_Power OFF" signal. In other words, the camera controller 173 recognizes that the App conversion does not exist since the App conversion information is false, and determines to turn the camera 160 off.

The camera controller 173 transmits the "Camera_Power OFF" signal to the camera 160 according to the determination to turn off of the camera 160 at operation 340. Accordingly, the camera 160 is turned off at operation 350. For example, first, the motor moves the body tube to the interior of the camera 160 under the control of the controller 173. After that, the camera controller 173 transmits the "Camera_Power OFF" signal to the camera 160 and discontinues the power supplied to the image sensor, the Image Signal Processor, and the motor according to the "Camera_Power OFF" signal. In addition, the camera controller 173 initializes the parameters (for example, a sensitivity, an automatic flash, etc.) set on the image sensor and the Image Signal Processor, and stores the initialized values in the storing unit 130.

On the other hand, the second App 172 is executed after the camera 160 is turned off at operation 360. The second App 172 transmits a Camera_Power ON signal to the camera controller 173 at operation 370.

The camera controller 173 receives the "Camera_Power ON" signal from the second App 172. Here, the camera controller 173 already knows that the camera 160 is in the power off state before receiving the "Camera_Power ON" signal. Therefore, the camera controller 173 transmits the "Camera_Power ON" signal to the camera 160 at operation 380. Accordingly, the camera 160 is turned on at operation 390. For example, according to the "Camera_Power ON" signal, power of a battery is supplied to a motor, an image sensor, and an Image Signal Processor. Accordingly, the motor moves a body tube to outside under the control of the controller 173.

In addition, the image sensor outputs a light received from a lens to the Image Signal Processor after converting into an electrical signal. The Image Signal Processor processes an electrical signal input from the image sensor into data, and processes the data as a preview image. Also, the Image Sensor Processor delivers the preview image to the second App 172 through the camera controller 173. The second App 172 displays the preview image by controlling the display unit 110.

Figure 4:
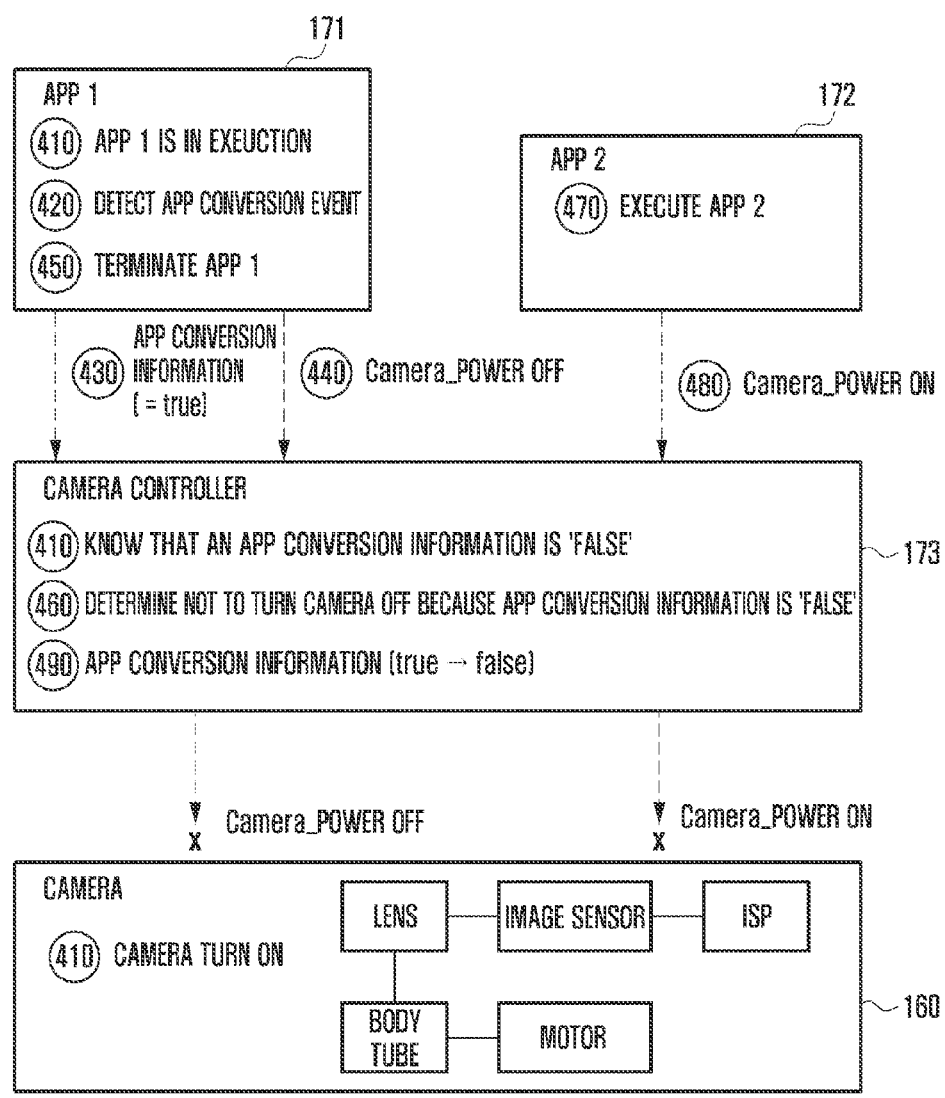
FIG. 4 is a software architecture explaining another example of a procedure of terminating an execution of a first App related to a camera, and executing a second App related to a camera according to an embodiment of the present disclosure.

FIG. 4 is a software architecture explaining another example of a procedure of terminating an execution of a first App related to a camera, and executing a second App related to a camera according to an embodiment of the present disclosure.

Referring to FIG. 4, a first app 171 is being executed, a camera 160 is in a turn on state, and a camera controller 173 knows that an App conversion information is 'false' at operation 410.

The first app 171 detects an App conversion event from an input unit (e.g., a touch panel 111 or a key input unit 120) at operation 420. The first App 171 sets the App conversion information as "true" (i.e., converting from the first App into the second App)", and the first App 171 transmits the App conversion information to the camera controller 173 at operation 430. Here, the first App 171 may transmit a parameter (e.g., a sensitivity, an automatic flash, etc.) related to a set of the camera 160 along with the App conversion information. The first App 171 transmits a "Camera_Power OFF" signal to the camera controller 173 at operation 440. After that, the execution of the first App 171 is terminated at operation 450.

The camera controller 173 receives the "Camera_Pwer OFF" signal from the first App 171. In response to the reception of the "Camera_Pwer OFF" signal, the camera controller 173 determines whether to turn the camera 160 off based on the App conversion information. That is, the camera controller 173 recognizes that the App conversion is generated because the App conversion information is true, and determines not to turn off the camera 160 at operation 460. Accordingly, the camera controller 173 does not transmit the "Camera_Power OFF" signal to the camera 160.

The second App 172 is executed at operation 470. The second App 172 transmits the "Camera_Power ON" signal to the camera controller 173 at operation 480.

The camera controller 173 receives the "Camera_Power ON" signal from the second App 172. In response to the reception of the "Camera_Power ON" signal, the camera controller 173 checks the App conversion information, and determines not to transmit the "Camera_Power ON" signal to the camera 160 when the App conversion information is "true" as a result of the check. However, the camera controller 173 resets the App conversion information from "true" to "false" in response to the reception of the "Camera_Power ON" signal at operation 490.

In addition, the camera controller 173 delivers the parameter received from the first App 171 to the second App 172. Accordingly, the second App 172 may control the camera 160 by using the parameter received from the first App 171. Of course, the second App 172 may control the camera 160 by using the initially set parameter.

Hereinabove, referring to FIG. 4, it has been converted from the first App into the second App, however, the operation of the camera is maintained unlike FIG. 3. Accordingly, a converting speed from the first App to the second App is fast and current consumption is reduced.

Figure 5:
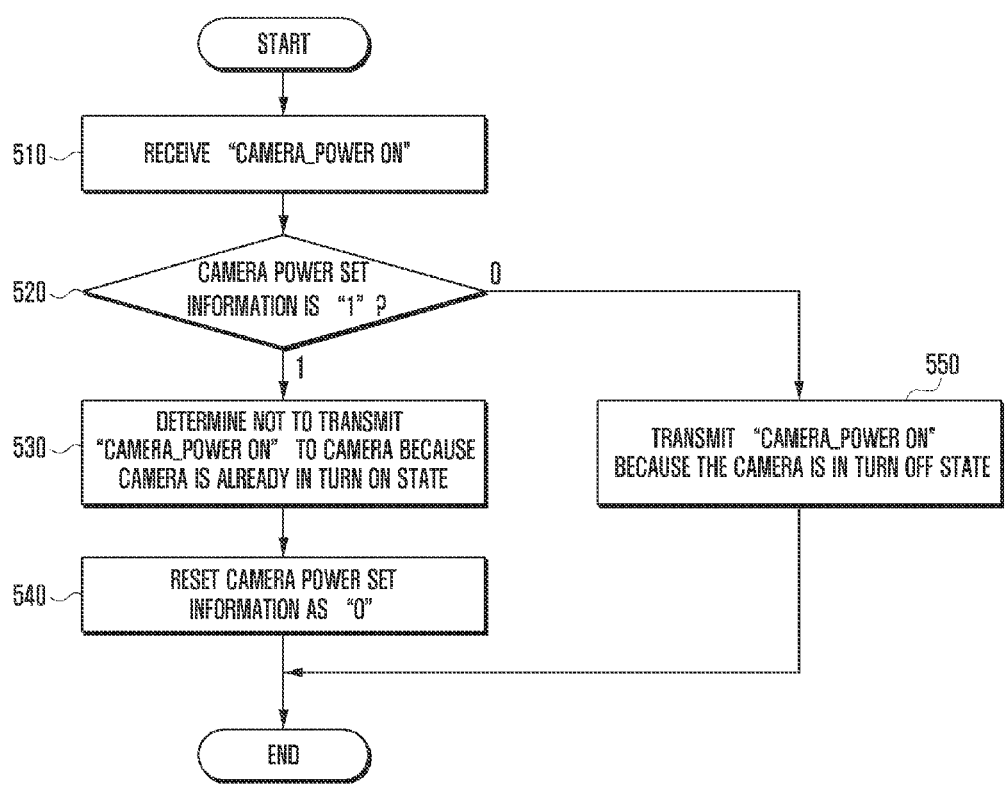
FIG. 5 is a flowchart explaining a method for controlling a camera according to an embodiment of the present disclosure.

FIG. 5 is a flowchart explaining a method for controlling a camera according to an embodiment of the present disclosure.

Referring to FIG. 5, first, the App related to the camera 160 is executed, and then, the App transmits the "Camera_Power ON" signal to the camera controller 173. The camera controller 173 receives the "Camera_Power ON" signal from the application at operation 510. The camera controller 173 checks the camera power set information in response to the reception of the "Camera_Power ON" signal at operation 520. Here, the camera power set information is the information referred by the camera controller 173 in order to figure out the state of the power of the camera 160.

The camera power set information is set as an initial value, for example "0", when the operating system is loaded to a main memory and the camera controller 173 is executed. That is, "0" is a value representing that the camera 160 is in an off state. In contrast, "1" is a value representing that the camera 160 is in an on state. In addition, the camera power set information may be included, for example, to a system file of a kernel of the operating system.

The camera controller 173 recognizes that the camera 160 is already turned on when the camera power set information is "1" as a result of step 520. Accordingly, the camera controller 173 determines not to transmit the "Camera_Power ON" signal to the controller 173 at operation 530. Next, the camera controller 173 resets the camera power set information from "1" to "0" at operation 540.

Here, step 540 may be performed when the "Camera_Power OFF" signal is received from the App. In other words, when the "Camera_Power OFF" signal is received from the application, the controller 173 transmits the "Camera_Power OFF" signal to the camera 160, and resets the camera power set information from "1" to "0".

The controller 173 recognizes that the camera 160 is turned off when the camera power set information is "0" as a result of step 520. Accordingly, the camera controller 173 transmits the "Camera_Power ON" signal to the camera 160 at operation 550.

Figure 6:
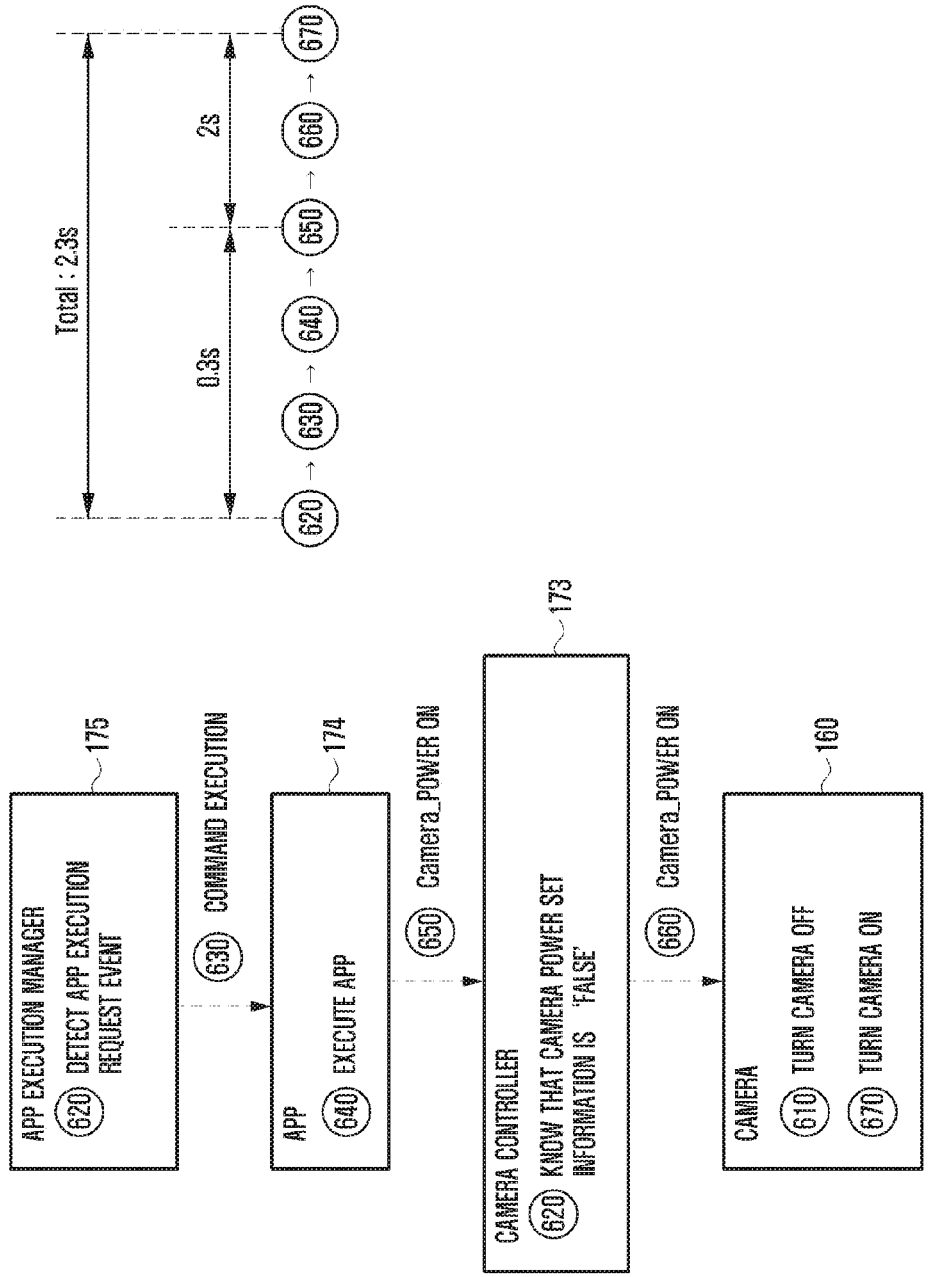
FIG. 6 is a software architecture explaining an example of a procedure of executing an App related to a camera and turning on power of a camera according to an embodiment of the present disclosure.

FIG. 6 is a software architecture explaining an example of a procedure of executing an App related to a camera and turning on power of a camera according to an embodiment of the present disclosure.

Referring to FIG. 6, the controller 170 includes the camera controller 173, an application 174, and the App execution manager 175. The camera is in a power off state, and the camera controller 173 knows that the camera power set information is "0" at operation 610.

The App execution manager 175 detects an event (e.g., a user taps an icon of a remote view finder) requesting an execution of the application 174 from the touch panel 111 or the key input unit 120 at operation 620. In response to the request event, the App execution manager 175 commands the execution to the application at operation 630. Accordingly, the application 174 is executed at operation 640. The application 174 transmits the "Camera_Power ON" signal to the camera controller 173 at operation 650. The camera controller 173 receives the "Camera_Power ON" signal from the application 174. Since the camera power set information is "0", the camera controller 173 transmits the "Camera_Power ON" signal to the camera 160 at operation 660. Accordingly, the camera 160 is turned on at operation 670. For example, according to the "Camera_Power ON" signal, the power of a battery is supplied to the image sensor and an Image Signal Processor. Accordingly, the image sensor outputs to the Image Signal Processor by converting light received from the lens into an electrical signal.

Also, the Image Signal Processor delivers the preview image to the application 174 through the camera controller 173. The application 174 displays the preview image by controlling the display unit 110. In addition, the application 174 controls the wireless communication unit 140 so that the preview image may be transmitted to another portable device (e.g., a smart phone). Accordingly, the smart phone receives and displays the preview image to the user.

It takes, for example, 0.3 second for the application 174 to be executed, and, thus, to receive the "Camera_Power ON" signal by the camera 160. Also, it takes, for example, 2 seconds for the camera 160 to be powered on, and, thus, the preview image to be displayed on another portable device. Therefore, it takes at least 2.3 seconds for the preview image to be provided to the user.

FIG. 7 is a software architecture explaining another example of a procedure of executing an App related to a camera and turning on power of a camera according to an embodiment of the present disclosure.

The camera 160 is in a power off state, and the camera controller 173 knows that the camera power set information is "0" at operation 710. The App execution manager 175 detects an event requesting the execution of the application 174 from the touch panel 111 or the key input unit 120 at operation 720.

In response to the execution request event of the application 174, the App execution manager 175 sets the camera power set information as "1" at operation 731. Accordingly, the camera power set information which has been set as "1" is delivered to the camera controller 173 at operation 732. The camera controller 173 recognizes that the camera power set information has changed from "0" to "1", and transmits the "Camera_Power ON" signal to the camera 160 at operation 733. The power of the camera 160 is turned on at operation 734.

In addition, in response to the execution request event of the application 174, the App execution manager 175 commands the execution to the application 174 at operation 741. Accordingly, the application 174 is executed at operation 742. The application 174 transmits the "Camera_Power ON" signal to the camera controller 173 at operation 743. The camera controller 173 receives the "Camera_Power ON" signal from the application. In response to the reception of the "Camera_Power ON" signal, the camera controller 173 checks the camera power set information at operation 743.

The camera controller 173 recognizes that the camera 160 is already turned on, and determines not to transmit the "Camera_Power ON" signal to the camera 160 when the result is "1" at operation 744. Next, the camera controller 173 resets the camera power set information from "1" to "0" at operation 745.

Hereinabove, according to FIG. 7, the execution of the application 174 and the turn on of the camera 160 may be accomplished at the same time. Therefore, when the user executes the application related to the camera 160, the time to provide its feedback (e.g., a preview image) to the user is reduced as compared to FIG. 6.

Hereinabove, according to the present disclosure, the method for controlling the camera and the mobile device may rapidly convert into a second App and reduce a consumption current by maintaining the power when it is required to convert into second App related to the camera after the execution of a first App related to the camera. In addition, when there is a user's request to execute an application related to the camera, the present disclosure may provide a method and a mobile device for turning on a camera and rapidly operating the camera by executing the corresponding application.

While the disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a camera in a mobile device, the method comprising:
   executing a first application related to the camera;
   turning the camera on in response to an execution of the first application;
   detecting a user's input related to a termination of the first application;
   determining whether the user's input is an Application (App) conversion event requesting an execution of a second application related to the camera;
   terminating the execution of the first application when the user's input is the App conversion event, and executing the second application; and
   terminating the execution of the first application when the user's input is not the App conversion event, and turning the camera off.

2. The method of claim 1, wherein the determining of whether the user's input is an App conversion event comprises:
   determining whether to turn the camera off based on App conversion information when receiving a camera power off request signal from the first application.

3. The method of claim 2, wherein the determining of whether to turn the camera off comprises:
   determining not to turn the camera off when receiving an App conversion information, indicating a conversion from the first application to the second application, from the first application.

4. The method of claim 1, wherein the executing of the second application comprises:
   checking a preset App conversion information when receiving a camera turn on request signal from the second application;
   determining not to transmit the camera turn on request signal to the camera when the App conversion information indicates a conversion from the first application to the second application; and
   resetting the App conversion information as an initial value.

5. A method for controlling a camera in a mobile device, the method comprising:
   receiving a first camera turn on request signal from an application;
   checking a camera power set information in response to a reception of the first camera turn on request signal;
   determining not to transmit the first camera turn on request signal to the camera, when the camera power set information indicates the camera is in a turn on state as a result of the check; and
   transmitting the first camera turn on request signal to the camera, when the camera power set information indicates the camera is in a turn off state as a result of the check.

6. The method of claim 5, further comprising:
   resetting the camera power set information as a value indicating the camera is in the turn off state after determining not to transmit the first camera turn on request signal to the camera.

7. The method of claim 5, further comprising:
   transmitting a second turn on request signal to the camera when the camera power set information is changed to the value indicating the camera is in the turn on state from a value indicating the camera is in the turn off state before receiving the first camera turn on request signal from the application.

8. A mobile device comprising:
   a camera;
   an input unit; and
   a controller configured to:
      detect a user's input from the input unit, and
      control the camera in response to the user's input,
   wherein the controller is further configured to:
      turn the camera on in response to an execution of a first application related to the camera,
      determine whether the user's input is an Application (App) conversion event requesting an execution of a second application related to the camera in response to a detection of a user's input related to a termination of the first application,
      terminate the execution of the first application and executes the second application when the user's input is the App conversion event, and
      terminate the execution of the first application and turns the camera off when the user's input is not the App conversion event.

9. The mobile device of claim 8, wherein the controller is further configured to:
   receive a camera turn off request signal from the first application, and
   determine whether to turn the camera off based on an App conversion information in response to a reception of the camera turn off request signal.

10. The mobile device of claim 9, wherein the controller is further configured to determine not to turn the camera off, when receiving App conversion information, indicating a conversion from the first application to the second application, from the first application.

11. The mobile device of claim 8, wherein the controller is further configured to:
   check a preset App conversion information upon reception of the camera turn on request signal from the second application,
   determine not to transmit the camera turn on request signal to the camera if the App conversion information indicates a conversion from the first application to the second application, and
   reset the App conversion information as an initial value.

12. A mobile device comprising:
   a camera;
   an input unit; and
   a controller configured to:
      detect a user's input from the input unit, and
      control the camera in response to a detection of the user's input,
   wherein the controller is further configured to:
      receive a first camera turn on request signal from an application,
      check a camera power set information in response to a reception of the first camera turn on request signal,
      determine not to transmit the first camera turn on request signal to the camera when the camera power set information indicates the camera is in a turn on state as a result of the check, and transmit the first camera turn on request signal to the camera when the camera power set information indicates the camera is in a turn off state as a result of the check.

13. The mobile device of claim 12, wherein the controller is further configured to reset the camera power set information as a value indicating the camera is in the turn off state after determining not to transmit the first camera turn on request signal to the camera.

14. The mobile device of claim 12, wherein the controller is further configured to transmit a second camera turn on request signal to the camera when the camera power set information has change from the value indicating the camera is in the turn off state to the value indicating the camera is in the turn on state before receiving the first camera turn on request signal from the application.

* * * * *